United States Patent
McGhee

(10) Patent No.: US 6,374,848 B1
(45) Date of Patent: Apr. 23, 2002

(54) AUTOMATIC MECHANISM FOR CUT-OFF AND DRAINAGE OF UNDER LOW-FREEZING AMBIENT TEMPERATURE CONDITIONS

(76) Inventor: John D. McGhee, 2414 Pine Crest La., Fredericksburg, VA (US) 22408

( * ) Notice: Subject to any disclaimer, the term of this patent is extended or adjusted under 35 U.S.C. 154(b) by 0 days.

(21) Appl. No.: 09/292,403

(22) Filed: Apr. 15, 1999

(51) Int. Cl.[7] .................. F16K 31/64; F16K 31/68; E03B 7/12
(52) U.S. Cl. ................ 137/62; 137/625.69; 236/48 R; 236/99 R; 251/67
(58) Field of Search .................. 137/59, 60, 61, 137/62, 79, 596, 597, 625.69; 138/32, 35; 236/48 R, 99 R; 251/67, 74

(56) References Cited

U.S. PATENT DOCUMENTS

| | | | | |
|---|---|---|---|---|
| 570,455 A | * | 11/1896 | Coleman et al. ............. | 137/61 |
| 746,115 A | * | 12/1903 | Lindsay ....................... | 137/61 |
| 1,526,718 A | * | 2/1925 | Opp ............................. | 137/60 |
| 1,558,276 A | | 10/1925 | Peterson ...................... | 137/62 |
| 1,820,473 A | | 8/1931 | Milone ........................ | 137/62 |
| 1,849,491 A | * | 3/1932 | Kelley ......................... | 137/61 |
| 1,875,513 A | * | 9/1932 | Smith .......................... | 137/61 |
| 2,387,792 A | * | 10/1945 | Holmes ....................... | 251/67 |
| 2,688,460 A | * | 9/1954 | Borgerd ...................... | 137/62 |
| 2,716,015 A | * | 8/1955 | Allen .......................... | 251/66 |
| 2,716,418 A | * | 8/1955 | Borgerd ...................... | 137/61 |
| 2,822,693 A | * | 2/1958 | Muslow ....................... | 137/62 |
| 3,320,965 A | | 5/1967 | Morgan ....................... | 137/62 |
| 3,369,556 A | | 2/1968 | Allderdice ................... | 137/62 |
| 3,618,625 A | * | 11/1971 | Walters ....................... | 137/62 |
| 4,066,090 A | | 1/1978 | Nakamima et al. ........... | 137/62 |
| 4,134,543 A | * | 1/1979 | Duprez et al. ......... | 137/625.69 |
| 4,243,062 A | * | 1/1981 | Shelton ....................... | 137/62 |
| 4,280,478 A | * | 7/1981 | Duval et al. ................. | 137/61 |
| 4,286,613 A | | 9/1981 | Lacoste ....................... | 137/62 |
| 4,360,036 A | * | 11/1982 | Shelton ....................... | 137/62 |
| 4,361,167 A | * | 11/1982 | Harasewych ................. | 137/62 |
| 4,438,777 A | * | 3/1984 | Pirkle ......................... | 137/62 |
| 4,484,594 A | | 11/1984 | Alderman ................... | 137/62 |
| 4,557,252 A | | 12/1985 | Dinh .......................... | 137/62 |
| 4,681,088 A | * | 7/1987 | Cromer ....................... | 137/62 |
| 4,717,072 A | * | 1/1988 | Girardin ..................... | 137/62 |

FOREIGN PATENT DOCUMENTS

JP 0179481 * 11/1982 ................ 137/62

* cited by examiner

Primary Examiner—George L. Walton
(74) Attorney, Agent, or Firm—Westerlund Powell, P.C.; Raymond H. J. Powell, Jr.; Robert A. Westerlund

(57) ABSTRACT

An automatic mechanism is provided for cutting-off water flow to a plumbing system of a house, an apartment, a business or the like, while at the same time draining water/plumbing systems when subjected to low/freezing ambient temperatures. The mechanism includes a valve body housing a reciprocal valve which is operative to place an inlet and an outlet in fluid communication while cutting off a drain port, and in a second position the inlet is closed and the outlet and the drain port are placed in fluid communication to drain the water system when the valve is shifted automatically under the influence of biasing means in reaction to low temperature sensing.

20 Claims, 6 Drawing Sheets

AUTOMATIC MECHANISM FOR CUT-OFF AND DRAINAGE OF UNDER LOW-FREEZING AMBIENT TEMPERATURE CONDITIONS

BACKGROUND OF THE INVENTION

In U.S. Pat. No. 4,286,613 granted on Sep. 1, 1981 to Marvin Lacoste, mention is made of allowing taps or faucets to drip thus preventing plumbing from freezing by allowing slow flow of water therethrough. If such taps are not opened in time or enough, damage to the water system, particularly through burst pipes, occurs. As a result of such ineffective efforts, a variety of automatic opening devices exist in the prior art.

One group of automatic opening devices effect automatic drip or slow water flow in associated water systems, such as U.S. Pat. No. 4,066,090 to Nakajima et al. and U.S. Pat. No. 3,369,556 issued to Allderdice on Feb. 20, 1968.

Other automatic opening devices automatically drain all water from the plumbing of associated water systems, such as U.S. Pat. No. 3,320,965 to Morgan, U.S. Pat. No. 1,820,473 to Milone and U.S. Pat. No. 1,558,276 to Peterson.

In many such water system freeze protecting devices, bellows are utilized, and, depending upon the specific type of device or its geographic location, the bellows might be filled with water which will freeze to ice or might be filled with a fluid, such as Freon or a Freon-gas mixture which contracts as the temperature drops and expands as the temperature rises. In either case, the bellows is associated with a valve for draining the particular water system. Unfortunately, each year though the cold months numerous water pipes freeze, burst, and thereby cause considerable damage, particularly in single family homes and residences. As an example of such damage, in 1996 nearly 20,000 State Farm policy holders in the United States and Canada suffered water damage to their homes (or apartments) because water pipes froze and burst. State Farm paid almost $57,000,000.00 to cover such frozen pipe damage losses, an average of approximately $2,871.00 per claim.

Many people follow conventional tips/wisdom for preventing frozen pipes, and thus do not think frozen pipes can happen to them. Typically, a homeowner will disconnect all garden hoses and other outside hose connections; insulate all exposed pipes and crawl spaces and attics since they are susceptible to freezing, set thermostats no lower than 55° F. (12° C.) even when the home is not occupied during the winter; let water drip (particularly overnight on extremely cold nights from both hot and cold faucets located along outside walls); and open cabinet doors so heat from a room can get to non-insulated pipes under sinks or the like. Unfortunately, a sudden cold snap combined with heavy wet snows and/or freezing rain can result in downed power lines which cut off power closing down household heating systems, including the thermostats thereof, for hours or days with the result that freezing occurs in the water systems irrespective of following prudent freeze prevention measures.

SUMMARY OF THE INVENTION

A primary object of the present invention is to provide a novel automatic valve system which is connected to the main water supply line at its point of introduction into a house, an apartment or the like. The valve mechanism includes a housing having a water inlet connected to the water supply from the street, a water outlet and a main valve which is preferably locked in a first position at which a diametric port maintains the water inlet and the water outlet in fluid communication with each other. In this position water is delivered from the water outlet to sinks, toilets, water heaters, etc. A shaft connected to the main valve is normally spring-biased in a direction which would move the main valve to a second position closing off water flow between the water inlet and the water outlet. However, the main valve shaft is immobilized with the valve in the first position by a temperature sensing mechanism which includes a bellows containing Freon or similar gas or fluid which contracts as the temperature drops. The bellows carries a locking pin which seats in a notch of the main valve shaft and, thus, is retracted therefrom as the Freon in the bellows contracts under temperatures at or below freezing. Upon the retraction of the locking pin, the biasing spring urges the main valve to a closed position cutting off fluid flow between the water inlet and the water outlet.

Contemporaneous with the closing of water flow through the main valve, another portion of the main valve places the water outlet in fluid communication with a drain opening or drain port which is connected by a tube or conduit to a floor drain, for example. Since all plumbing in the house is connected to the main water outlet of the automatic valve mechanism, water from all of the internal plumbing drains in a reverse direction into the water outlet through a drain by-pass port of the valve and a drain outlet of the valve housing into the drain pipe and subsequently discharges into the floor drain. Accordingly, should temperature in the house drop to or substantially below freezing, all of the water in the house plumbing is drained and no damage can occur therein. Furthermore, the water inlet and the main water supply are preferably heavy insulated and rupture or pipe bursting in this area is virtually impossible. However, should even this occur, the automatic valve mechanism is located immediately in the area into which the main water supply from the street enters the home, and this is usually a basement or a crawl space or the like. Therefore, should the water inlet side burst, any water from the street would not effect the living quarters of the house but would instead drain into a crawl space or a basement, and more likely than not the latter includes a floor drain which is normally code-required. Thus, the automatic valve mechanism assures that the main water supply is not only terminated under substantially freezing water conditions, but the house plumbing is also completely drained of water thereby preventing plumbing/pipe/appliance damage.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
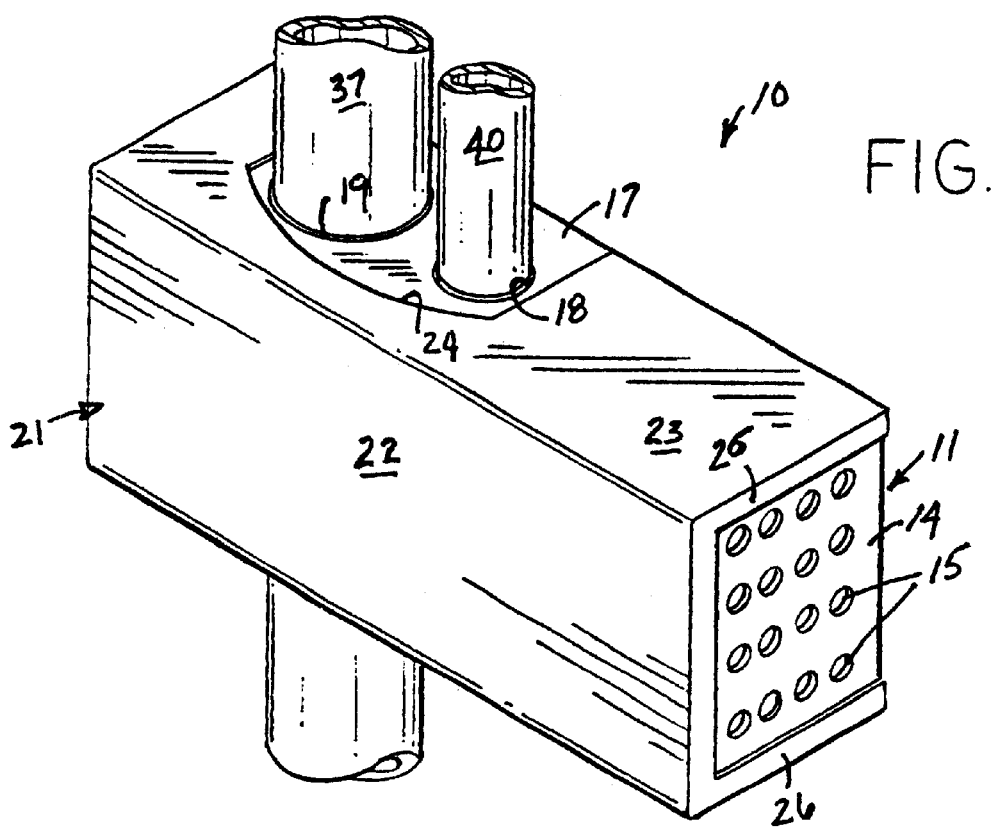
FIG. 1 is an exploded fragmentary perspective view, and illustrates a main water supply line entering a basement and connected thereto is an automatic valve mechanism of the present invention for precluding pipes from bursting at substantially freezing ambient temperature or below.

A novel automatic water cut-off and drain mechanism operative at low/freezing ambient temperatures to cut-off water flow and drain a water system is generally designated by the reference numeral 10 (FIG. 1).

The automatic drain mechanism 10 is best illustrated in FIG. 1 in association with a typical installation as might be found in a basement B of a residence, such as a single dwelling house, an apartment, a condominium or the like. The basement B includes a conventional wall W which might be constructed from concrete, cinder block, or a combination thereof, and a floor F, usually constructed from concrete, having a conventional floor drain D. Located in the basement B might be, for example, a conventional hot water heater H, a relatively deep wash sink S, and perhaps a clothes washer (not shown). The hot water heater H, the sink S, the clothes washer (not shown), a pedestal sink P located on the floor above the basement B and other associated water-usage appliances, such as kitchen and bathroom sinks, toilets, etc. are all interconnected by a conventional plumbing/watering system PS defined by numerous individual metal (copper) or plastic pipes or conduits C running throughout a conventional residence, including in or along walls, floors and ceilings thereof. Obviously, if any one or more of such pipes C of the plumbing system PS freezes and/or bursts under temperatures substantially at or below 32° F. (0° C.), extensive water damage more often than not would be expected.

The water for the plumbing system PS normally enters a residence somewhere in its basement or a crawl space associated therewith by means of a main water supply pipe or line M from a conventional street supply or a well. The main water supply line M is shown entering the basement B through the floor F, but it can as well enter through the wall W, normally sufficiently below the frost line to prevent freezing. Though not shown, the portion of the main water supply pipe M projecting into the basement B is heavily insulated after the installation of the automatic drain mechanism 10 to preclude water therein from freezing, as is essentially the entirely of the exterior of the automatic valve mechanism 10, except for an apertured end thereof, as will be described more fully hereinafter.

A main gate valve G is located in a main line ML which provides water service to the entire plumbing system PS in a conventional manner. The main gate valve G is shown in its "ON" position, and when a handle (unnumbered) thereof is rotated, the main gate valve can be completely closed to prevent water from flowing into the plumbing system PS via the main line ML.

The automatic drain mechanism 10 includes a two-piece exterior housing defined by a first exterior housing body 11 and a second exterior housing body 21.

The first exterior housing body 11 includes a rear wall 12 of a generally rectangular configuration, opposite end walls 13, 14, the latter of which is provided with a plurality of circular openings or apertures 15, a partition wall 16, an upper wall 17 having adjacent circular openings 18, 19, and a lower wall 20.

The second housing wall 21 includes a relatively long rectangular front wall 22, a top wall 23 having a generally U-shaped cut-out or slot 24 (FIG. 2) formed therein, a bottom wall (unnumbered) and opposite pairs of end flanges 25, 26 which slidably mate with the opposite end walls 13, 14 of the first exterior housing body 11. In this manner the exterior housing bodies 11, 21 define a relatively closed chamber which is, however, exposed to ambient temperature within the basement B through the plurality of holes or openings 15 in the end wall 14.

The automatic drain mechanism 10 further includes a valve housing 30 defined by a main substantially cylindrical valve housing body 31 defining a substantially cylindrical internal surface 32 closed at axially opposite ends by conventional threaded cylindrical and conical end caps 33, 34, respectively. A water inlet port 35 carries a nut 36 and is in axial aligned relationship to a water outlet port 37 carrying a conventional threaded nut 38. The nuts 36, 38 unite the valve housing 30 to the respective main water supply line M and to the main line ML in the manner clearly illustrated in FIG. 1 of the drawings.

A drainage port or drainage outlet 40 opens through the cylindrical surface 32 and exits through the opening 18 in the upper wall 17 of the housing 11, and is preferably placed in liquid communication with the drain D (FIG. 1) by a clear flexible polyethylene pipe 45.

Figure 5:
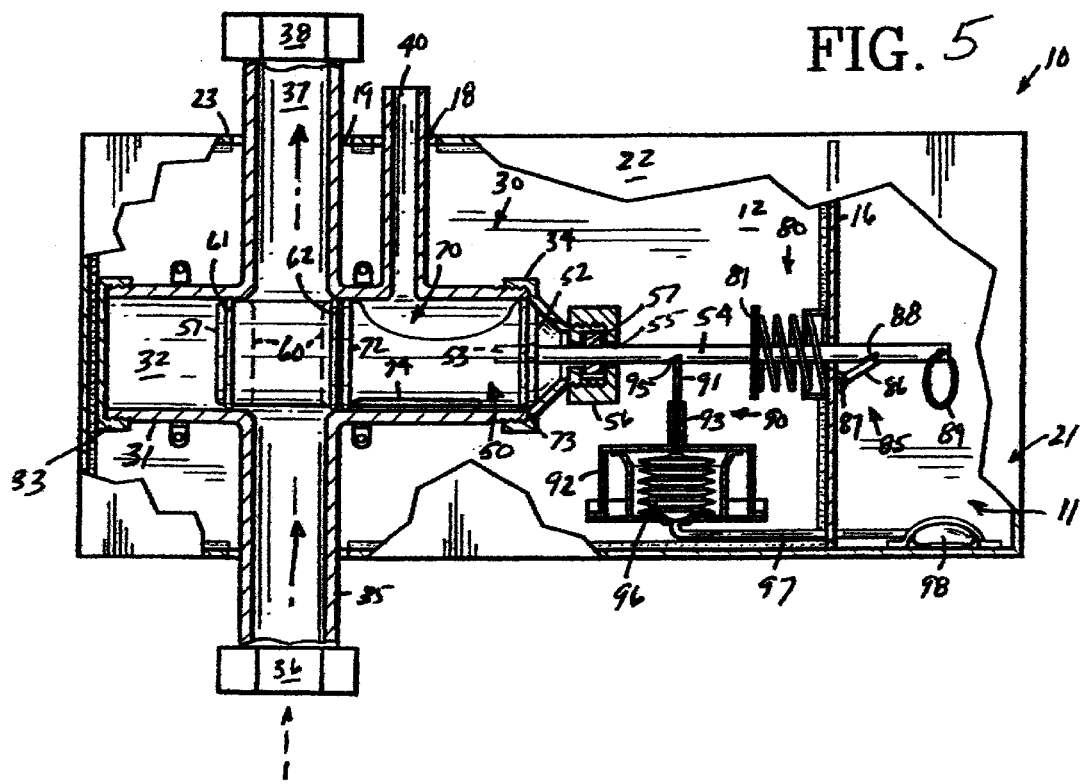
FIG. 5 is a fragmentary side elevational view of the automatic water drain mechanism, and illustrates a valve housing in cross section and a valve thereof in a first position in which water flows from the water inlet through a diametric port in the valve and out the water outlet.
Figure 6:
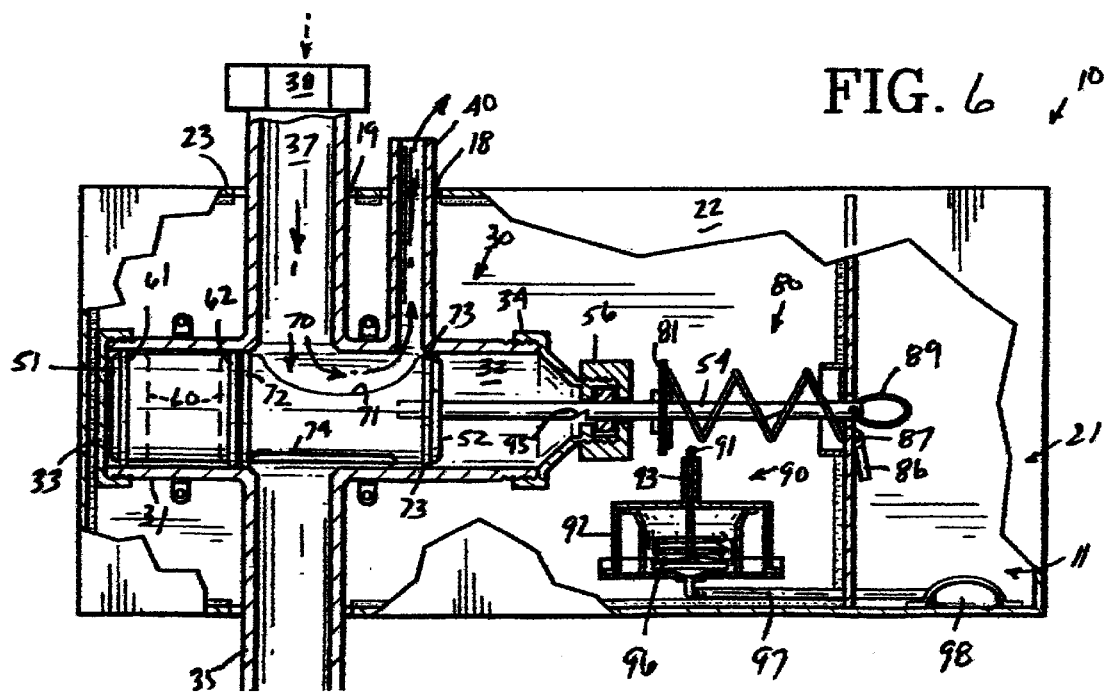
FIG. 6 is a fragmentary side elevational view with parts also shown in cross-section similar to FIG. 5, and illustrates the valve in a second position closing off water flow between the water inlet and the water outlet and placing a drain opening and drain port in fluid communication with the water outlet to drain water from house pipes/plumbing/appliances into a drain line or dump line and an associated floor drain.

A generally cylindrical valve or valve body 50 is axially slidable along the cylindrical surface 32 between a first position shown in FIG. 5 and a second position shown in FIG. 6. The valve 50 includes axially opposite ends 51, 52, the latter of which includes a threaded bore 53 into which is threaded a valve stem, shaft or rod 54 which is preferably of a rectangular transverse cross-section corresponding to a like rectangular opening 55 formed in a nut 56 which houses a washer 57 and is threaded to the conical end cap 34. Due to the polygonal transverse cross-section of the rod 54 and the opening 55, the rod 54 cannot rotate nor can the valve 50 carried thereby.

A diametrical port 60 is formed through the left end of the valve 50, as viewed in FIGS. 5 and 6, and when in the position shown in FIG. 5, water flowing into the water inlet 35 passes through the diametric port 60 and flows into and through the water outlet 37, as is indicated by the unnumbered headed arrow associated therewith. O-ring seals 61, 62 seal against the cylindrical surface 32 of the cylindrical valve housing body 31 and prevent water leakage in the position illustrated in FIG. 5 of the drawings.

The right-hand side of the valve 50, again as viewed in FIGS. 5 and 6, includes an axial passage or port 70 defined in part by a curved wall 71 which extends substantially between O-ring seals 72 and 73. Another seal 74 is carried by the cylindrical surface of the valve 50 diametrically opposite from the channel 70 and between the seals 72, 73. When the valve 50 moves to the second position thereof shown in FIG. 6 under the influence of near freezing, freezing or lower than freezing temperatures in a manner to be described more fully hereinafter, the valve 50 is so positioned as to cut-off water flow between the inlet 35 and the outlet 37 (FIG. 6), noting that the seal 74 creates a seal with the opposing surface (unnumbered) of the port 35, and in conjunction with the seals 72, 73 assure that water from the plumbing system PS flowing under the influence of gravity flows downward into the water outlet 37 (FIG. 6), through the channel or port means 70 and into the drain port 40 exiting therefrom into the drain line 45 (FIG. 1) and eventually dumping into the floor drain D to completely drain the plumbing system PS.

Means 80 (FIGS. 5 and 6) in the form of a spring surrounding the shaft 54 seats against the partition wall 16 and against a pin or washer 81 fixed to the shaft 54.

As is best illustrated in FIG. 5 of the drawings, two different means 85, 90 are provided for selectively preventing automatically operative biasing means 80 from shifting the shaft 54 to the left, the first means 85 being a manual override of the automatic second means 90 which is operative under substantially freezing ambient outdoor temperatures to bias the valve 50 to the "dump" or "drain" position of FIG. 6.

The manual override means 85 includes a lever 86 pivoted at 87 to the partition wall 16 and having an end (unnumbered) received in a notch 88 (FIG. 5) of the shaft 54 which carries an O-ring handle 89. When the lever or detent 86 is seated in the notch 88, the valve 50 occupies the first position thereof shown in FIG. 5 with the port 60 in diametric alignment with the inlet 35 and the outlet 37. In this operative position of the manual override 88, the automatic biasing means 80 is inoperative for its intended purpose irrespective of the position of a pin or detent 91 of the automatic second means 90, as will be readily apparent immediately hereinafter.

Figure 2:
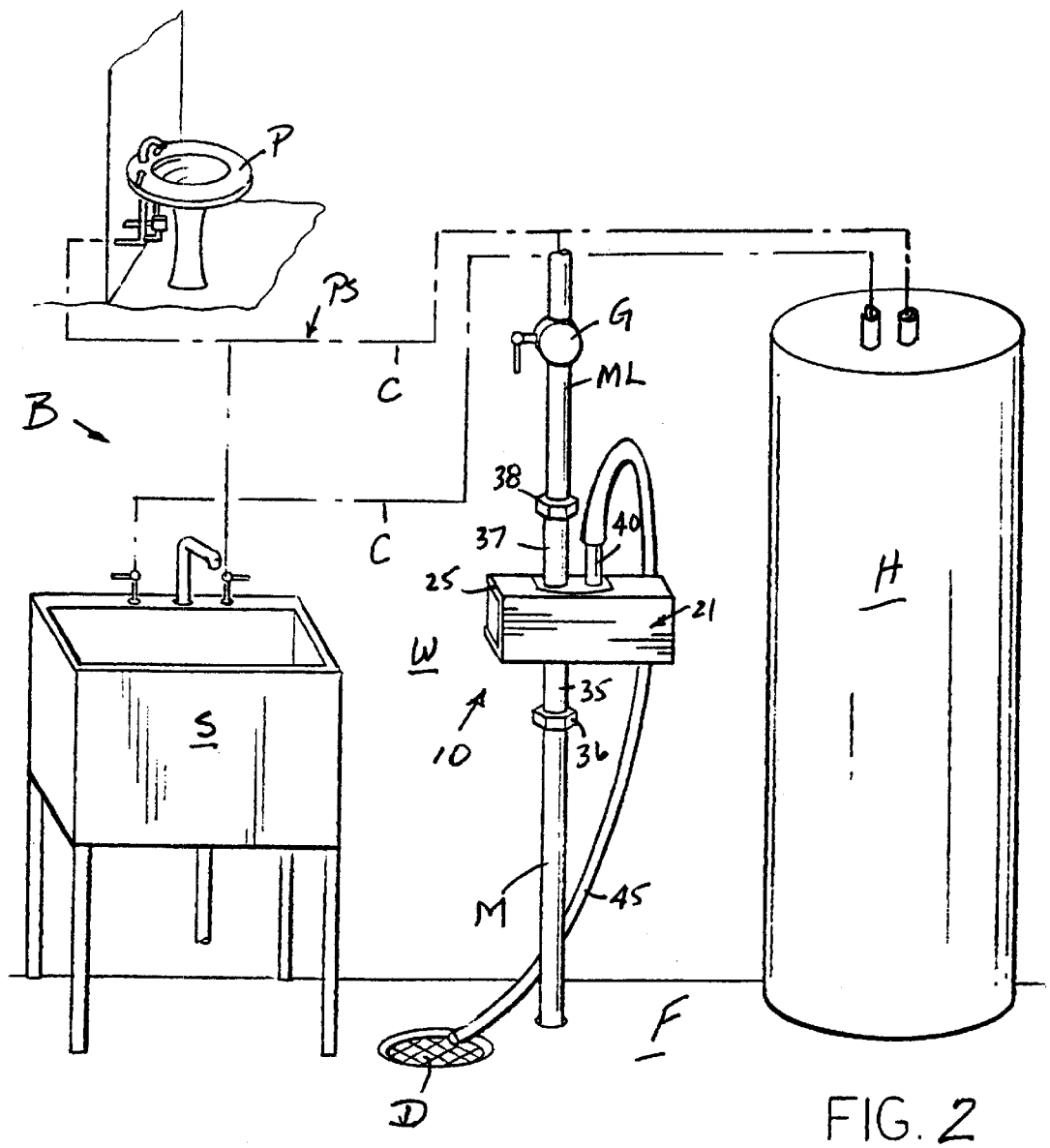
FIG. 2 is a perspective view of the automatic water drain mechanism, and illustrates an axially aligned water inlet and a water outlet, a drain associated with the water outlet, and openings for permitting ambient air to enter the housing.
Figure 3:
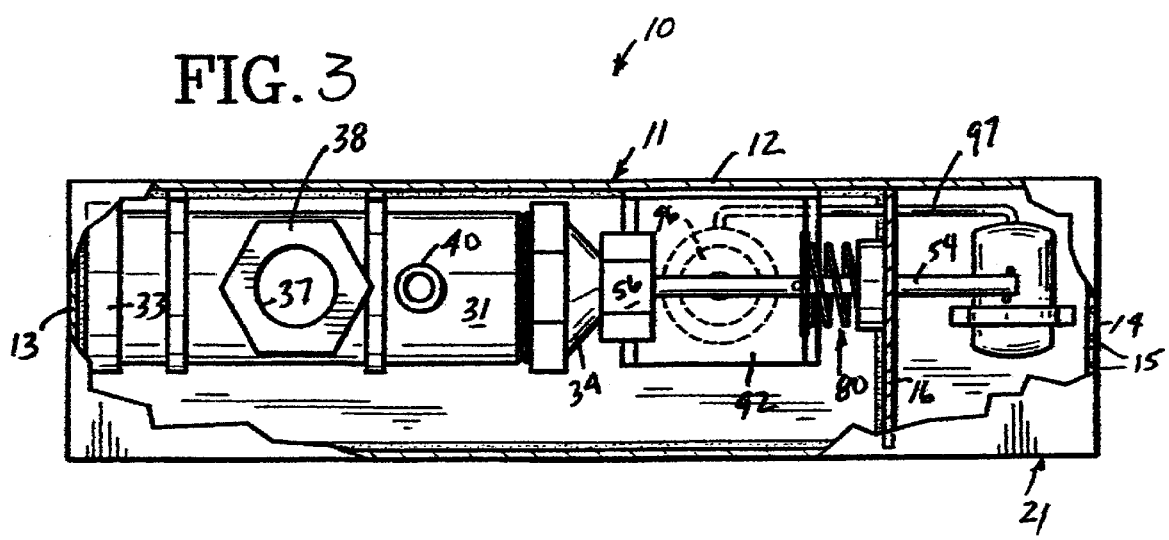
FIG. 3 is a fragmentary top plan view of the automatic water drain mechanism of FIG. 2, and illustrates a temperature sensing mechanism connected by a conduit to a bellows housing Freon and a biasing spring normally biasing a valve rod or shaft to the left.
Figure 4:
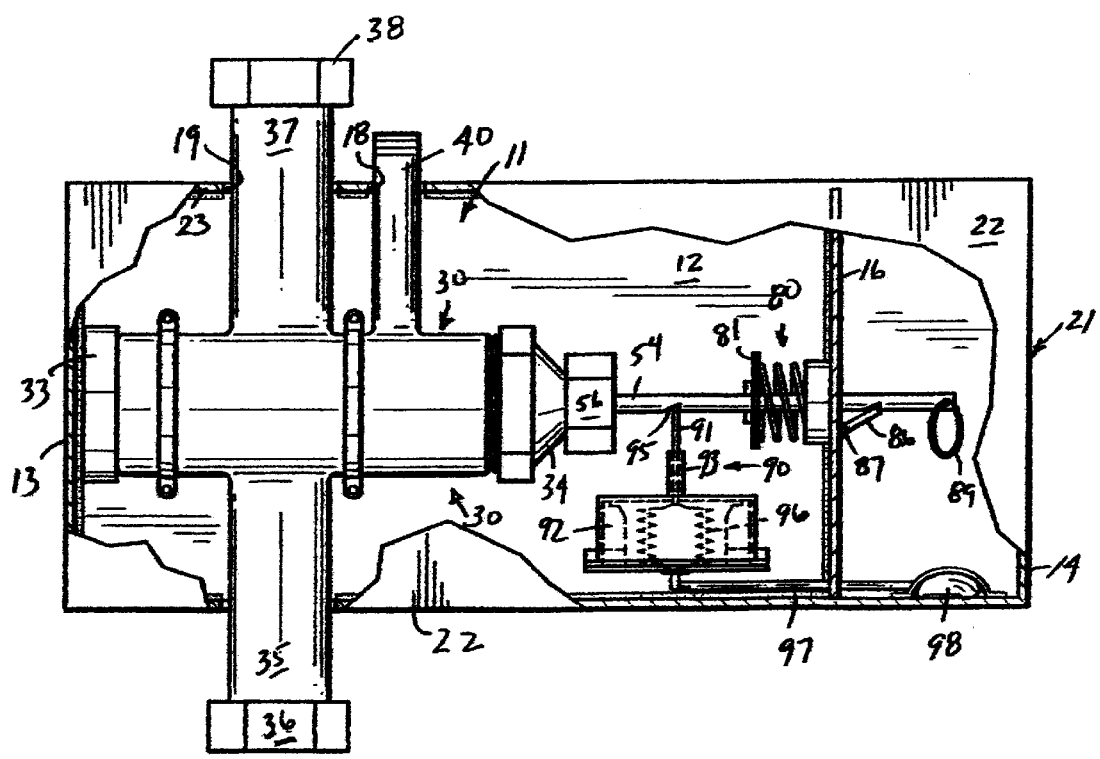
FIG. 4 is a side elevational view of the automatic water drain mechanism of FIG. 2 with parts broken away for clarity, and illustrates a detent or pin engaging a notch of the valve rod to prevent movement of the latter to the left, and a manually operable pin for overriding the biasing spring.

The automatic second means 90 prevents the spring 80 from biasing the valve 50 from the position shown in FIG. 5 to the position shown in FIG. 6 when ambient temperatures are above freezing (32° F./0° C.), and also permits the spring 80 to bias the valve 50 to the position shown in FIG. 6 when ambient temperatures are at substantially freezing (32° F./0° C.). The means 90 includes a housing 92 suitable fixed in the position shown in FIGS. 5 and 6 to the interior of the first housing body 11 with an integral guide sleeve 93 thereof slidably receiving the pin or detent 91 in alignment with a notch 95 of the valve rod 54. The detent 91 is carried by a hollow spring bellows 96 which is constructed to inherently return from its expanded position (FIG. 5) to its retracted position (FIG. 6) under the inherent spring-biased nature of the bellows itself. However, the bellows 96 is part of a closed fluid system which includes a pipe 97 and a conventional sensing bulb 98 located immediately adjacent the openings 15 of the end wall 14 (FIG. 2). The sensing bulb 98, the pipe 97 and the bellows 96 contain Freon or a similar fluid or gas which is charged into the bellows 96 at temperatures well above 32° F. Freon or a Freon gas mixture will contract as temperature drops and, of course, expands as temperature rise. Thus, the closed-circuit system is pressurized sufficiently such that as temperature approaches 32° F., the Freon will contract, the bellows will similarly contract from the fully expanded position shown in FIG. 5, and at 31.5° F. the bellows will have sufficiently retracted to fully withdraw the detent 91 from the slot 95 resulting in the spring 80 biasing the rod 54 to the left from the first position shown in FIG. 5 to the second position shown in FIG. 6. In the latter position, water in the plumbing system PS drains by gravity into the main house line ML, into the water outlet 37, through the channel or passage 70 and eventually through the drain opening 40 and the drain pipe 45 into the floor drain D. Water from the main water supply pipe M is precluded from entering the valve body 31 because of the position of the valve 50 shown in FIG. 6 including the position of the seal 74 preventing water flow past the valve 50. Thus, in the position shown in FIG. 6, the plumbing system is drained, and water from the main water supply line M cannot flow beyond the valve 50. Furthermore, the high insulation earlier herein noted surrounding the pipes M and 35 and the automatic drain mechanism 10 (not shown in FIG. 1), except for the openings 15, preclude freezing of the water therein. Thus, drainage of the plumbing system PS is assured and correspondingly water damage to the residence is precluded.

After the valve 50 has been shifted to the second position thereof (FIG. 6), should temperatures rise, the detent 91 will again move upwardly toward and against the rod 54 but will be ineffective for any purpose whatever. However, in order to re-establish water flow, the homeowner need but grasp the O-ring handle 89, pull the rod 54 to the right, and the detent 91 will again engage in the slot 95 which once again "arms" the automatic valve mechanism 10 for subsequent operation.

The manual override 85 maybe maintained in its operative position (FIG. 5) during summer months to make certain that under any malfunction of the means 90, the valve 50 will not move to the second/closed position of FIG. 6. Since there is no particular concern of freezing during summer months, using the manual override 85 assures water flow in the event, for example, the bellows 96 might leak resulting in reduced pressure and the withdrawal of the detent 91 from the slot 95. Thus, the automatic valve mechanism assures that the plumbing system PS is drained and also prevents water flow from the supply via the main water supply pipe M.

Although a preferred embodiment of the invention has been specifically illustrated and described herein, it is to be understood that minor variations may be made in the apparatus without departing from the spirit and scope of the invention, as defined the appended claims.

What is claimed is:

1. An automatic water drain mechanism operative at low ambient temperature to cut-off water flow in a main water supply line of a building, comprising:

a valve housing, said valve housing having a water inlet and a water outlet, said housing being divided into first and second compartments;

a valve disposed in said first compartment of said valve housing, which is movable between a first position maintaining water flow from said water inlet to said water outlet and a second position cutting-off such water flow;

means for biasing said valve in a direction of movement toward said second position;

means for preventing said biasing means from biasingly moving said valve to said second position;

means for sensing ambient air temperature disposed in said second compartment of said valve housing; and bellow means responsive to said ambient temperature sensing means for deactivating said preventing means at substantially 32° Fahrenheit and therewith rendering said biasing means operative for biasing said valve to said second position.

2. The automatic water drain mechanism as defined in claim 1, comprising means for automatically draining water from downstream piping when said valve is in the second position of said valve.

3. The automatic water drain mechanism as defined in claim 1 wherein said sensing means includes a temperature sensing bulb.

4. The automatic water drain mechanism as defined in claim 1, comprising means for automatically draining said water outlet upon said valve cutting-off water flow in the second position of said valve, said draining means including a drain opening in said valve housing and port means in said valve for placing said drain opening and said water outlet in fluid communication in the second position of said valve.

5. The automatic water drain mechanism as defined in claim 1, comprising a valve stem of said valve projecting beyond said valve housing, and said biasing means being constructed and arranged for biasing said valve stem in said direction of movement toward said second position.

6. The automatic water drain mechanism as defined in claim 1, comprising means for overriding the operation of said biasing means at substantially 32° Fahrenheit to prevent said valve being biased to said second position.

7. The automatic water drain mechanism as defined in claim 1, comprising closed fluid circuit means between and in part defined by said sensing means at said bellows means.

8. The automatic water drain mechanism as defined in claim 1, further comprising closed fluid circuit means between and in part defined by said sensing means at said bellows means, and wherein said sensing means comprises a temperature sensing bulb.

9. The automatic water drain mechanism as defined in claim 1, comprising closed fluid circuit means between and in part defined by said sensing means at said bellows means, and said bellows means includes a pressure chamber operatively coupled to a piston carrying a piston rod connected to said preventing means.

10. A temperature operated drain system operative at low ambient temperature to cut-off water flow in a main water supply line servicing a building and to drain downstream piping of water to thereby prevent damage to the downstream piping due to freezing, comprising:

a housing divided into first and second compartments;

a valve disposed in the first compartment, having an inlet port, an outlet port, and a drain port, the valve having a first mode of operation wherein the inlet and the outlet ports are fluidly connected to one another and a second mode of operation wherein the outlet port and the drain port are fluidly connected to one another;

a spring which urges the valve between the first mode of operation and the second mode of operation;

a first device which prevents operation of the spring;

a temperature sensor disposed in the second compartment for sensing ambient air temperature; and a second device operatively coupled between the temperature sensor and the first device, wherein a decrease in the ambient air temperature sensed by the temperature sensor permits movement of the first device to a position which does not prevent operation of the spring to thereby permit the valve to shift from the first mode of operation to the second mode of operation.

11. The drain system as recited in claim 10, wherein the second device and the temperature sensor are fluidly coupled to one another.

12. The drain system as recited in claim 11, wherein the second device and the temperature sensor are fluidly coupled to one another via a relatively small diameter pipe.

13. The drain system as recited in claim 10, wherein the decrease in the ambient air temperature to approximately 32° Fahrenheit sensed by the temperature sensor permits movement of the first device to a position which does not prevent operation of the spring to thereby permit the valve to shift from the first mode of operation to the second mode of operation.

14. The drain system as recited in claim 10, wherein:

the valve, the spring, the first device, and the second device are disposed within a first housing;

the temperature sensor is disposed within a second housing; and the temperature sensor and the second device are operatively connected to one another by a relatively small diameter pipe.

15. The drain system as recited in claim 10, wherein the temperature sensor comprises a temperature sensing bulb.

16. The drain system as recited in claim 10, wherein the valve comprises a valve spool disposed within a valve body and wherein the first and second modes of operation are defined by relative position of the valve spool with respect to the valve body.

17. A temperature operated control device for a supply line of a system providing water to a building, the control device having a valve equipped with an inlet port, an outlet port, and a drain port, the valve having a first mode of operation wherein the inlet and the outlet ports are fluidly connected to one another and a second mode of operation wherein the outlet port and the drain port are fluidly connected to one another, the valve shifting from the first mode of operation to the second mode of operation when ambient air temperature decreases below a predetermined temperature, the control device comprising:

a spring which urges the valve between the first mode of operation and the second mode of operation;

a first device having an engaged position which prevents operation of the spring and a disengaged position which permits operation of the spring;

a temperature sensor for sensing the decrease in ambient air temperature; and a second device operatively coupled between the temperature sensor and the first device, wherein:

the decrease in the ambient air temperature sensed by the temperature sensor is transmitted from the second device to the first device to thereby permit the first device to move from the engaged position to the disengaged position so as permit the valve to shift from the first mode of operation to the second mode of operation responsive to force applied by the spring;

all of the valve, the spring, the first and second devices, and the temperature sensor are disposed within a unitary housing divided internally into first and second compartments;

the valve is disposed in the first compartment; and the temperature sensor is disposed in the first compartment.

18. The temperature operated control device as recited in claim 17, wherein the second device and the temperature sensor are fluidly coupled to one another.

19. The temperature operated control device as recited in claim 17, wherein the decrease in the ambient air temperature to approximately 32° Fahrenheit sensed by the temperature sensor permits movement of the first device to the disengaged position to thereby permit the valve to shift from the first mode of operation to the second mode of operation.

20. The temperature operated control device as recited in claim 17, wherein:

the spring, the first device, and the second device are disposed within a first housing enclosing the valve;

the temperature sensor is disposed within a second housing; and the temperature sensor and the second device are operatively connected to one another by a relatively small diameter pipe.

* * * * *